United States Patent
Chen et al.

(10) Patent No.: US 10,156,433 B1
(45) Date of Patent: Dec. 18, 2018

(54) SYSTEM AND METHOD FOR MEASURING DISPLACEMENT

(71) Applicant: The Chinese University of Hong Kong, Hong Kong (CN)

(72) Inventors: Shih-Chi Chen, Hong Kong (CN); Fu Feng, Hong Kong (CN); Wang Chen, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 0 days.

(21) Appl. No.: 15/839,658

(22) Filed: Dec. 12, 2017

(51) Int. Cl.
*G01B 9/02* (2006.01)
*G01D 5/353* (2006.01)

(52) U.S. Cl.
CPC ..... *G01B 9/02084* (2013.01); *G01B 9/02015* (2013.01); *G01B 9/02055* (2013.01); *G01D 5/35303* (2013.01)

(58) Field of Classification Search
CPC ............ G01B 9/02084; G01B 9/02088; G01B 9/02094; G01B 9/02095; G01B 9/02096
See application file for complete search history.

(56) References Cited

U.S. PATENT DOCUMENTS

| | | |
|---|---|---|
| 3,940,608 A | 2/1976 | Kissinger et al. |
| 4,671,659 A | 6/1987 | Rempt et al. |
| 6,788,397 B1 * | 9/2004 | Golowich .............. G01M 11/33 356/121 |
| 7,532,329 B2 | 5/2009 | Tai et al. |
| 2012/0092651 A1 * | 4/2012 | Molin .................. G01M 11/088 356/73.1 |
| 2014/0049779 A1 * | 2/2014 | Tin ........................ G01B 11/30 356/456 |

OTHER PUBLICATIONS

Qi et al., "Compact micro-displacement sensor with high sensitivity based on a long-period fiber grating with an air-cavity", *Optics Express*, 21:3, 3193-3200 (Feb. 11, 2013).
Dash et al., "Nano-displacement senor based on photonic crystal fiber modal interferometer", *Optics Letters*, 40:40, 467-470 (Feb. 15, 2015).
Moreno-Hernandez et al., "Single tapered fiber tip for simultaneous measurements of thickness, refractive index and distance to a sample", *Optic Express*, 23:17, 22141-22148 (Aug. 24, 2015).

* cited by examiner

*Primary Examiner* — Jonathan Hansen
(74) *Attorney, Agent, or Firm* — Leydig, Voit & Mayer, Ltd.

(57) ABSTRACT

A method and a system for determining a displacement of an object are provided. The method includes: providing a predetermined modal power distribution characteristic; directing a light onto the object resulting in a reflected light; propagating the reflected light through different propagation modes, receiving a resulting modal power distribution characteristic; and comparing the resulting modal power distribution characteristic with the predetermined modal power distribution characteristic to determine the displacement of the object.

20 Claims, 4 Drawing Sheets

SYSTEM AND METHOD FOR MEASURING DISPLACEMENT

TECHNICAL FIELD

The present disclosure relates to the field of measurement technology, specifically to displacement measurement technology, and more specifically to a system and method for measuring a displacement.

BACKGROUND

Displacement measurement technology finds wide applications in fields such as medical sector, structural integrity monitoring, and aeronautics. Ultraprecise displacement sensing (<10 µm) may also be extensively applied in micro- and nano-fabrication applications and industries, enabling high precision fabrication processes.

Fiber displacement sensors, such as Fabry-Perot interferometric sensor, fiber Bragg grating, and long period fiber gratings have been proposed before. The use of fiber Bragg grating based sensors for displacement measurement suffers from design fabrication complexities. The Fabry-Perot sensor uses liquids and flexible membrane and is prone to high stress. These Fiber displacement sensors are also in contact with the sample during the use. In one example, a fiber ring is placed in contact with the sample. When the sample is moved, the fiber ring will be mechanically deformed, thereby perturbing the optical environment of the waveguide along the fiber ring, resulting in changes of the output intensity or spectrum.

Existing products to monitor displacements with nanometer precision in a non-contact fashion includes capacitance probe. Generally, in order to apply the principle of the capacitor to detect the displacement and the position of a measurement object, it is necessary to have an electrode plate on the measurement object. When the object is non-metal, a metal plate needs to be attached to enable the measurement, which is inconvenient and undesirable for positioning and nano-fabrication applications. In addition, the reading obtained by the capacitor sensor may be affected, if the sample of the capacitor sensor during measurement is in an unfavorable electric or magnetic environment. As such, the capacitor sensor is generally not suitable for being applied to a sub-nanometer scale displacement measurement where the object is usually small and light weight, where the space for installation of the electrode plate is limited or where high noise signals caused by electromagnetic radiation exist.

For example, the resolution of conventional optical lithography is limited by the diffraction. Near-field optical lithography is the most promising emerging technique to break the diffraction limit. Generally, the distance between the writing head and the photo-resist (few micrometers generally) need to be controlled precisely, in the 100 s nm range, in order to ensure satisfying results. However, it is difficult to monitor the distance between the detector and the object with products such as capacitance probes, due to the size and material issues.

Another example is the measurement of parallelism of two surfaces. Parallelism is a critical condition to achieve for many engineering applications, e.g., fabrication or instrument installation. Although measuring the parallelism of two metal surfaces can be achieved by using three capacitance probes, it cannot be easily done on other surfaces such as semiconductors or polymers.

Therefore, there is a need for method and a system for measuring a displacement of an object which overcome the above described shortcomings.

SUMMARY

Embodiments of the present disclosure provide a method and a system for measuring a displacement of an object.

One aspect of the disclosure provides a method for determining a displacement of an object. The method includes: providing a predetermined modal power distribution characteristic; directing a light onto the object resulting in a reflected light; propagating the reflected light through different propagation modes, receiving a resulting modal power distribution characteristic; and comparing the resulting modal power distribution characteristic with the predetermined modal power distribution characteristic to determine the displacement of the object.

Another aspect of the disclosure provides a system for determining a displacement of an object. The system includes: a multimode waveguide including a first end and a second end; a light source providing a light onto an surface of the object resulting in a reflected light, the reflected light entering the first end of the multimode waveguide, propagating through the multimode waveguide and exiting the second end of the multimode waveguide, the exited reflected light having a modal power distribution; and a modal power distribution sensor capturing the exited reflected light at the second end, and extracting a characteristic of the modal power distribution.

BRIEF DESCRIPTION OF THE DRAWINGS

These and other features of the disclosure will become more apparent from the following description in which reference is made to the appended drawings wherein.

DETAILED DESCRIPTION OF EMBODIMENTS

Reference will now be made in detail to some specific embodiments of the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims. In the following description, numerous specific details are set forth in order to provide a thorough understanding of the present disclosure. The present disclosure may be practiced without some or all of these specific details. In other instances, well-known process operations have not been described in detail in order not to unnecessarily obscure the present disclosure.

Figure 1:
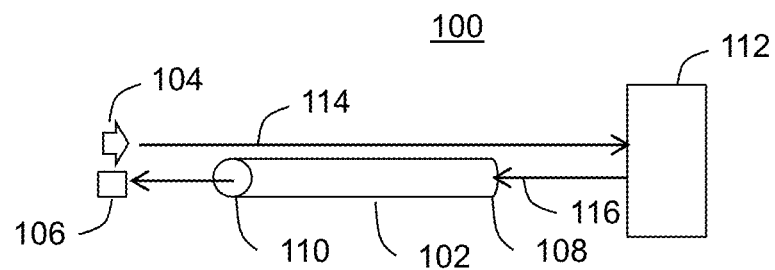
FIG. 1 is an illustrative diagram of a system for measuring a displacement of an object according to an embodiment of the present disclosure.

In FIG. 1 there is an illustrative diagram of a system 100 for measuring a displacement of an object according to one embodiment of the present disclosure. The system 100 may include a multimode waveguide 102, a light source 104, and a modal power distribution sensor 106.

The multimode waveguide 102 includes a first end 108 and a second end 110. The multimode waveguide 102 includes, for example but is not limited to: a multimode fiber, a multimode thin-film waveguide, a multimode ridged waveguide, and a multimode planer waveguide. Preferably, the multimode waveguide is a multimode fiber. It should be apparent to a person skilled in the art that a multimode fiber has a large core diameter, i.e. much larger than the wavelength of the light carried in it. Consequently, the multimode fiber also has a large numerical aperture at the first end 108.

The light source 104 is used for providing a light 114 onto an surface of an object 112. The light source may be a coherent light source. Preferably, the light source is a laser. The light may be single-wavelength or multi-wavelength. Preferably, the light is a coherent light. The object 112 whose displacement is to be determined is located near the first end 108. After reflection by the surface of the object 112, the light 116 enters the first end 108 of the multimode waveguide 102.

When the light, after entering the first end 108, propagates through the multimode waveguide 102, relative phases of the optical propagation modes travel throughout the multimode waveguide 102, resulting in constructive and destructive interferences between the propagating modes, and a modal power distribution results, manifested as a complex speckle pattern when the light exists the second end 110.

The coupling ratio (amplitude and phase) between the reflected light 116 and the fiber eigenmodes depends strongly on the distance between the surface of the object 112 and the first end 108. The amplitude varies fast in the near field range where the evanescent wave dominates. Accordingly, the intensity of the reflected light 116 varies (or decays) as a function of the distance between the first end 108 and the surface of the object 112. The coupling phase changes fast as the wavelength of the light 114 is generally short, between 200 nm and 10,000 nm, preferably between 300 and 1,000 nm, and more preferably between 300 and 800 nm. A small variation during light propagation can therefore significantly alter the propagation phase $$\Delta \varphi = \frac{d}{\lambda} * 2\pi,$$

where $\Delta \varphi$ is the phase difference, d is the displacement, $\lambda$, is the light wavelength.

The far field modal power distribution of a multimode fiber can be expressed as the equation below:

$$A_0(x, y) = \sum_{m=0}^{M} a_m(x, y) \exp[i\varphi_m(x, y)]$$

where M is the modal number of the fiber and $a_m(x, y)$, $\varphi_m(x, y)$ are the amplitude and phase distribution of the $m^{th}$ mode. The intensity distribution of the modal power can thus be expressed as:

$$I_0(x, y) = |A_0(x, y)|^2 = \sum_{m=0}^{M} \sum_{n=0}^{N} a_m a_n \exp[i(\varphi_m - \varphi_n)]$$

The modal power distribution sensor 106 captures the exited light at the second end 110, and extracts the characteristic of the modal power distribution. The modal power distribution sensor 106, a general purpose computing device or a specialized computing device then compares the characteristic of the modal power distribution with a predetermined modal power distribution characteristic.

In one embodiment, the predetermined modal power distribution characteristic is one of a plurality of modal power distribution characteristics. In one embodiment, the modal power distribution characteristics are records in a database, which are assigned to corresponding positions of the object 112.

In one embodiment, the modal power distribution sensor 106, the general purpose computing device or the specialized computing device compares the characteristic of the modal power distribution with the records of the database, and finds the best match between the characteristic of the modal power distribution and a given predetermined modal power distribution characteristic, and determines the position of the object 112 based on the given predetermined modal power distribution characteristic.

In one embodiment, the modal power distribution characteristic is a specklegram, and the modal power distribution sensor is a camera, preferably a CCD camera.

Figure 2:
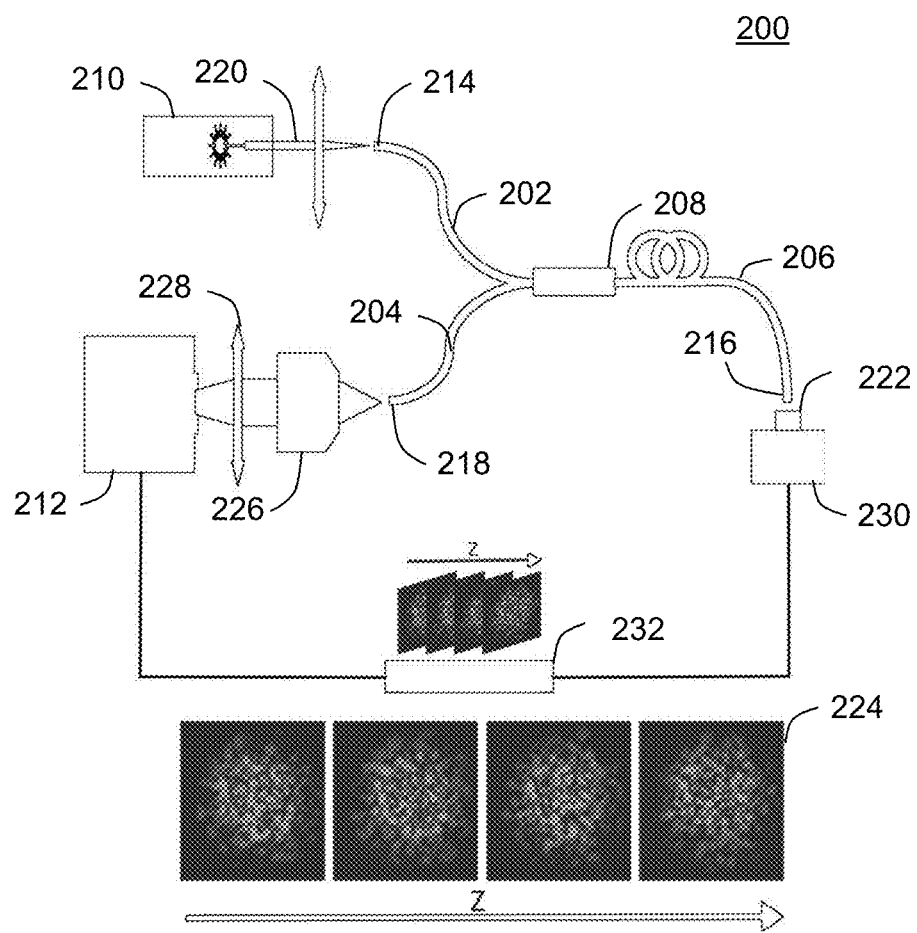
FIG. 2 shows an illustrative diagram of a system 200 for measuring a displacement of an object according to an embodiment of the present disclosure.

FIG. 2 shows an illustrative diagram of a system 200 for measuring a displacement of an object according to another embodiment of the present disclosure.

The system 200 may include a bifurcated multimode fiber 202, 204 and 206, a coupler 208, a light source 210, and a detector 212.

The bifurcated multimode fiber 202, 204 and 206 may be fused at the coupler 208, and includes a first end 216, a second end 218, a third end 214. It should be apparent to a person skilled in the art that any fusing ratio may be used. A fusing ratio of 50/50 is used in the present embodiment.

It should be apparent to a person in the art that the multimode fiber may be substituted by other suitable multimode waveguides, for example but is not limited to: a multimode thin-film waveguide, a multimode ridged waveguide, and a multimode planer waveguide. It should also be apparent to a person skilled in the art that a multimode fiber has a large core diameter, i.e. much larger than the wavelength of the light carried in it. Consequently, the multimode fiber also has a large numerical aperture at the first end 216 of the multimode fiber 206.

The bifurcated multimode fiber 202, 204 and 206 may have any suitable size as described by their core and cladding diameters. For example, 50/150 µm multi-mode fiber has a core size of 50 micrometers (µm) and a cladding diameter of 150 µm. Multimode fibers having different dispersion characteristics may be used: for example but not limited to: a step-index profile having a sharp transition, or a graded-index profile having a gradual transition between the core and cladding.

In the present embodiment, the bifurcated multimode fiber may be a 50/150 μm step index multimode fiber with a numerical aperture (NA) of 0.22.

The light source 210 is used for providing a light onto a surface of an object 222, and may be coupled to the third end 214 of the multimode fiber 202. The light source 210 may be a coherent light source. Preferably, the light source is a laser. The light 220 from the light source 210 is guided through the multimode fiber 202, the coupler 208 and the multimode fiber 206 and exits the multimode waveguide 206 at the first end 216. The object 222 whose displacement is to be determined is located near the first end 216 of the multimode fiber 206, in a non-limiting exemplary embodiment, 2-5 μm away from the first end 216.

The light is reflected by the surface of the object 222, and re-enters the first end 216 of the multimode fiber 206. When the light, after entering the first end 216, propagates through the multimode fiber 206, relative phases of the optical propagation modes of the light travel throughout the multimode fiber 206, the coupler 208 and the fiber 204, resulting in constructive and destructive interferences between the propagating modes, and a modal power distribution characteristic results, manifested as a complex speckle pattern, also known as specklegram 224, when the light exists the second end 218 of the multimode fiber 204.

The coupling ratio (amplitude and phase) between the reflected light and the fiber eigenmodes depends strongly on the distance between the surface of the object 222 and the first end 216. The amplitude varies fast in the near field region where the evanescent wave dominates. Accordingly, the laser intensity of the reflected light varies (or decays) as a function of the distance between the first end 216 and the surface of the object 222. The coupling phase changes fast as the wavelength of the light 220 is generally short. A small variation during light propagation can therefore significantly alter the propagation phase $$\Delta \varphi = \frac{d}{\lambda} * 2\pi,$$

where $\Delta\varphi$ is the phase difference, d is the displacement, $\lambda$, is the light wavelength.

The far field modal power distribution of a multimode fiber can be expressed as the equation below:

$$A_0(x, y) = \sum_{m=0}^{M} a_m(x, y) \exp[i\varphi_m(x, y)]$$

where M is the modal number of the fiber and $a_m(x, y)$, $\varphi_m(x, y)$ are the amplitude and phase distribution of the $m^{th}$ mode. The intensity distribution of the specklegram can thus be expressed as:

$$I_0(x, y) = |A_0(x, y)|^2 = \sum_{m=0}^{M} \sum_{n=0}^{N} a_m a_n \exp[i(\varphi_m - \varphi_n)]$$

The detector 212 captures the exited light at the second end 218, and extracts the specklegram. The detector 212, a general purpose computing device 232 or a specialized computing device then compares the specklegram with a preset specklegram.

In one embodiment, the preset specklegram is one of a plurality of preset specklegrams. The specklegrams are records of a specklegram database, and the specklegrams are assigned to corresponding positions of the object 222.

In one embodiment, the detector 212, the general purpose computing device 232 or the specialized computing device compares the specklegram with the records of the specklegram database, and finds the best match between the specklegram and a given preset specklegram, and determines the position of the object 222 based on the given preset specklegram.

In one embodiment, the detector is a camera, for example a CCD camera, a CMOS camera, preferably a CCD camera.

In one embodiment, a Fourier optical unit may be included to enhance the resolution of the specklegram. As shown in FIG. 2, a Fourier lens 228 and an objective 226 may be added in front of the detector, in this embodiment the camera 212. Here, the spatial intensity distribution of the specklegram at its Fourier plane is recorded by the camera 212, i.e., Fourier space of the output specklegram is conjugated at the CCD camera by the Fourier lens 228, to filter out the coherent back ground noise through the Fourier transform process.

The specklegram depends strongly on the distance between the object 222 and the first end 216 of the multimode fiber 206. To determine displacement with specklegrams, a plurality of specklegrams are recorded as the object is moved away from a reference surface, where the position of each recorded specklegram can be determined by a reference displacement sensor, for example but not limited to, an interferometer or a capacitance probe. To determine an exact location of object positioned arbitrarily in space, one can compare the specklegram recorded at that specific position with the specklegram database, when correlation coefficient reaches the maximum value, it indicates that the two images or specklegrams are recorded at the same position, or at a closest position, accordingly the exact position of the object can be determined.

Figure 3:
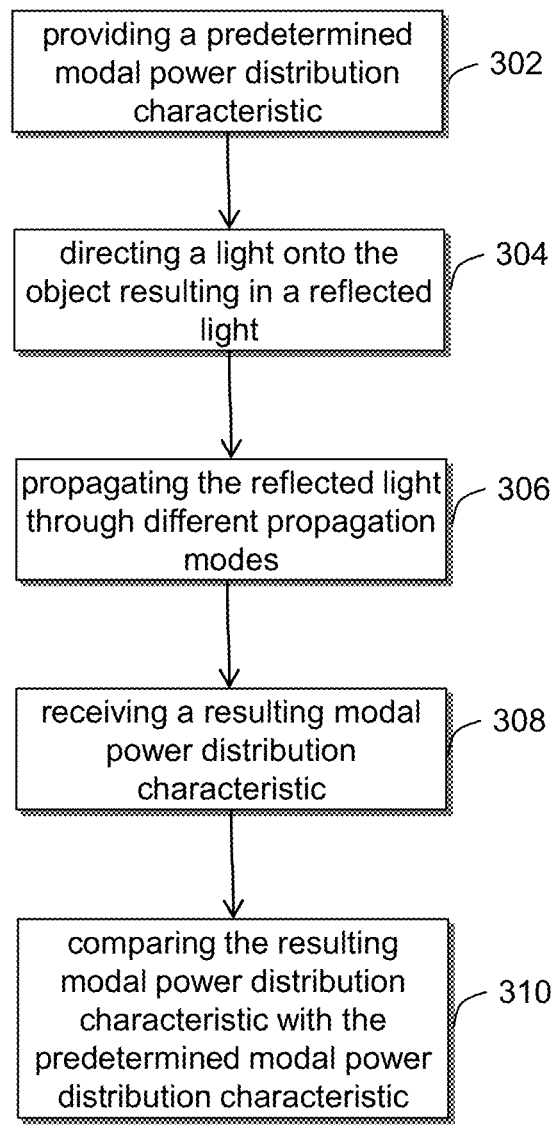
FIG. 3 shows a flowchart illustrating a method for determining a displacement of an object according to an embodiment of the present disclosure.

FIG. 3 shows a flowchart illustrating a method for determining a displacement of an object according to one embodiment of the present disclosure. As shown in FIG. 1, the method includes the following steps.

At step 302, a predetermined modal power distribution characteristic is provided. The predetermined modal power distribution characteristic may be, for example, a specklegram. The modal power distribution characteristic may be determined a prior as described by the embodiments herein, or acquired through other means known to a person skilled in the art. The predetermined modal power distribution characteristic may be a record in a predetermined modal power distribution characteristic database.

At step 304, a light is directed onto an object whose displacement is to be measured. The light is reflected by the surface of the object, resulting in a reflected light. Preferably, the light is a coherent light. In this embodiment, the light may be a laser light.

In one embodiment, the reflected light is propagated through a multimode waveguide. Preferably, the multimode waveguide is a multimode fiber.

In one embodiment, an end of the multimode fiber is within a near field range of the object. The coupling ratio (amplitude and phase) between the reflected light and the multimode fiber eigenmodes depends strongly on the distance between the surface of the object and the end of the multimode fiber. The amplitude varies fast in the near field range where the evanescent wave dominates. Accordingly, the laser intensity of the reflected light varies (or decays) as a function of the distance between the multimode fiber end and the surface of the object. The coupling phase changes fast as the wavelength of the light is generally short. A small variation during light propagation can therefore significantly alter the propagation phase.

At step 306, the reflected light is propagated through different propagation modes. Herein, relative phases of the optical propagation modes of the light interfere in constructive and destructive modes, and a modal power distribution characteristic emerges.

In one embodiment, the predetermined modal power distribution characteristic is a specklegram.

At step 308, the resulting modal power distribution characteristic is received.

In one embodiment, the resulting modal power distribution characteristic is received by a modal power distribution sensor.

In one embodiment, the resulting modal power distribution characteristic is received by a camera.

In one embodiment, the resulting modal power distribution characteristic passes through a Fourier lens to enhance the resolution of the specklegram.

At step 310, the resulting modal power distribution characteristic is compared with the predetermined modal power distribution characteristic to determine the displacement of the object.

In one embodiment, the comparison leads to a binary result, namely, when the resulting modal power distribution characteristic matches the predetermined modal power distribution characteristic, the object is at a desired location.

In one embodiment, the predetermined modal power distribution characteristic is one of a plurality of modal power distribution characteristics. The modal power distribution characteristics are records in a database, which are assigned to corresponding positions of the object. Using this approach, the location of the object may be determined based on the best match between the resulting modal power distribution characteristic and one of the modal power distribution characteristics in the database.

Figure 4:
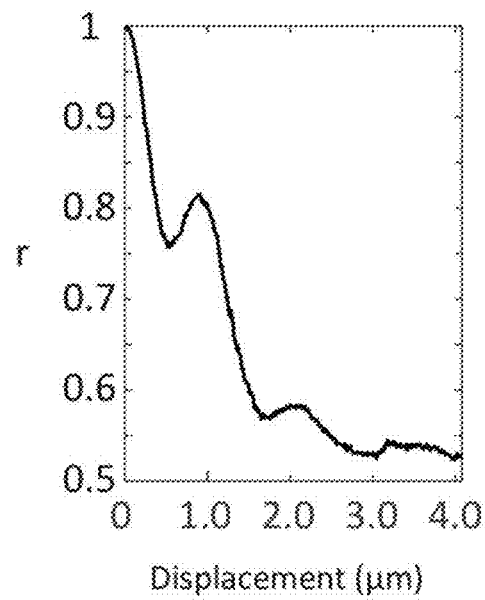
FIG. 4 is a diagram showing calculated correlation coefficients in relation to specklegrams recorded at different locations compared to the specklegram recorded at the original location.

FIG. 4 is a diagram showing calculated correlation coefficients in relation to specklegrams recorded at different locations compared to the specklegram recorded at the original location.

The differences between the different specklegrams may be quantitatively compared to determine the exact displacement of the object. A 2D correlation coefficient representing the similarity between two specklegrams in relation to their respective pixel intensity, is defined as:

$$r = \frac{\sum_m \sum_n (A_{mn} - \overline{A})(B_{mn} - \overline{B})}{\sqrt{\left(\sum_m \sum_n (A_{mn} - \overline{A})^2\right)\left(\sum_m \sum_n (B_{mn} - \overline{B})^2\right)}}$$

where $A_{mn}$ and $B_{mn}$ represent the values of individual CCD pixels in (i.e., m×n pixels) of two images A and B; $\overline{A}$ and $\overline{B}$ denote the mean values of matrix A and B respectively.

In the embodiment shown in FIG. 4, also referring to FIG. 2, the first end 216 is placed close to the surface of the object 222 at a close range, for example, at less than 1 µm. Next, the object 222 is moved away from the first end 216 slowly with a preset step size, for example, 2-100 nm depending on the need of precision with a precision piezoelectric positioner 230, when specklegrams 224 are recorded at each step. The measurement range of the system shown in FIG. 4 may be about 10 µm, i.e. within the near field range. The total number of specklegrams collected as well as the step size together determine the resolution and range of the displacement detection. The system can detect fine displacement from 0-10 µm with a precision of few nanometers when enough specklegrams 224 are available in the database. FIG. 4 presents the calculated correlation coefficients between the first specklegram recorded at z=0 and the remaining specklegrams recorded at increasing distances. It can be seen from FIG. 4 that when comparing the first specklegram with the remaining specklegrams, the correlation coefficient does not decrease continuously, but with some oscillation behavior. Also, the correlation coefficient reaches the maximum value when displacement is zero.

Figure 5:
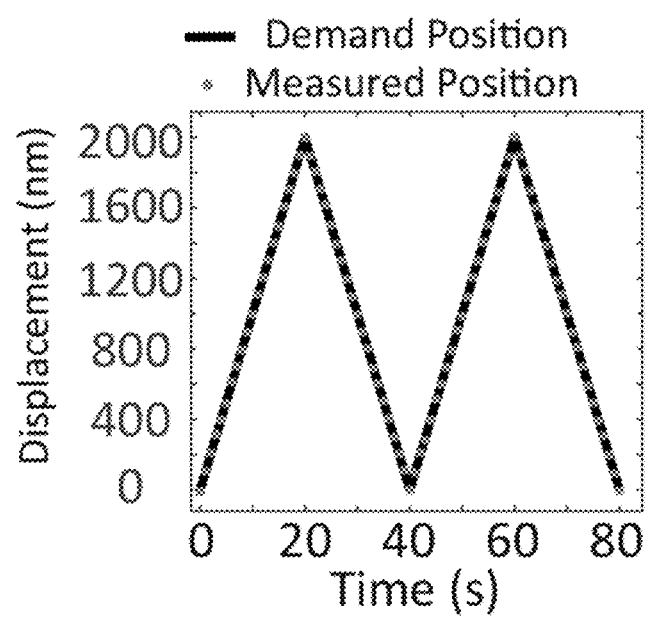
FIG. 5 shows the tracking of the displacement of the object.

FIG. 5 shows the tracking of the displacement of the object. As described above, to determine the displacement with specklegrams, a plurality of specklegrams are recorded as the object is moved away from a reference surface, where the position of each recorded specklegram can be determined by a reference displacement sensor, for example but not limited to, interferometer or capacitance probes. A database of specklegrams may be constructed through this approach. Also referring to FIG. 2, once the database is constructed, it is possible to track the displacement of the object within the recorded range in the database. For example, in FIG. 5, the object 222 is moved by the piezo-stage 230 continuously and the positions of the object 222 in relation to the first end 216 are recorded every second, where the results, as indicated by the dots, from the specklegrams are compared with the command positions sent to the piezo-stage 230, as indicated by the line. The results indicate that the system achieves precision within 10 nm repeatability, and shows no signs of hysteresis.

FIG. 5 therefore shows that the system can precisely follow the displacement of the object 222, where the measurement range of the system is between 0 and 10 µm. The measurement dynamics (or speed) is limited only by the speed of the detector 212, in the present embodiment, the exposure speed and the storage speed of the CCD camera. In the present embodiment, the speed is 100 images per second.

Figure 6:
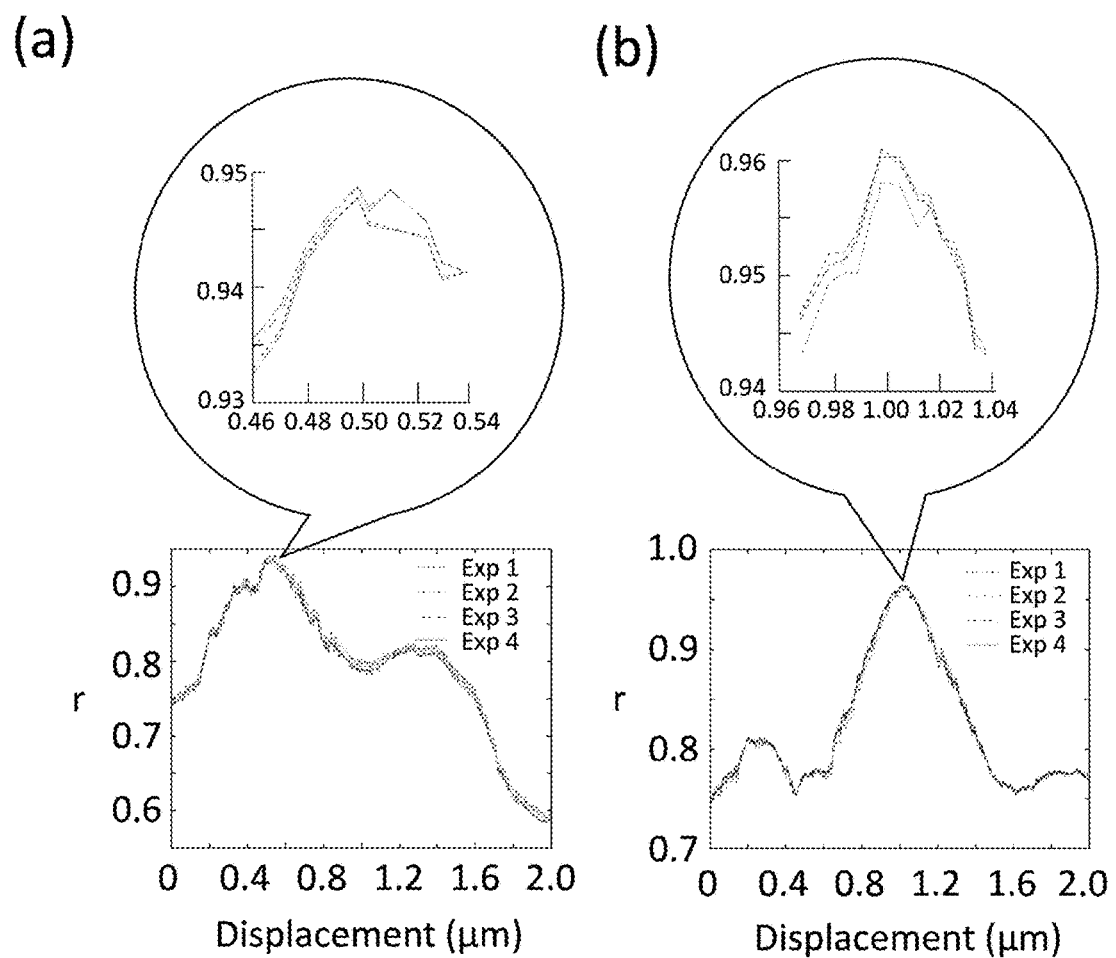
FIGS. 6(a) and (b) illustrate the correlation coefficient between captured specklegrams at displacements at 500 nm and 1000 nm, respectively.

FIGS. 6(a) and (b) illustrate the precision of the measurement where FIG. 6(a) shows the correlation coefficient between the captured four specklegrams at displacement=500 nm and the database, and FIG. 6(b) shows the correlation coefficient between the captured four specklegrams at displacement=1000 nm and the databases. FIGS. 6(a) and (b) indicate that the trajectories of the correlation coefficients are different as they reach the maximum values. FIGS. 6(a) and (b) show that once the databases are constructed, it is possible to read out the real position of the object by comparing the real time specklegram with the specklegrams in the databases. The inserts in FIGS. 6(a) and (b) show a zoom-in views of the regions where the correlation coefficient is at or close to the maximum value. It can be concluded from the curves in inserts that even with the noises, the position of the object may be read out with a precision of about 10 nm. Further, in FIGS. 6(a) and (b), four different correlation coefficient curves calculated from four specklegrams recorded at the same position substantially overlap, indicating high repeatability of the position sensing.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is further understood that the use of relational terms such as first and second, and the like, if any, are used solely to distinguish one from another entity, item, or action without necessarily requiring or implying any actual such relationship or order between such entities, items or actions.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for determining a displacement of an object, the method comprising:
   providing a predetermined modal power distribution characteristic;
   directing a light onto the object resulting in a reflected light;
   propagating the reflected light through different propagation modes;
   receiving a resulting modal power distribution characteristic; and
   comparing the resulting modal power distribution characteristic with the predetermined modal power distribution characteristic to determine the displacement of the object.

2. The method according to claim 1, wherein the light is a coherent light.

3. The method according to claim 1, wherein the reflected light is propagated through a multimode fiber.

4. The method according to claim 1, wherein both the predetermined modal power distribution characteristic and the resulting modal power distribution characteristic are specklegrams.

5. The method according to claim 1, wherein both the predetermined modal power distribution characteristic and resulting modal power distribution characteristic are specklegrams, and the predetermined modal power distribution characteristic is provided by a specklegram database.

6. The method according to claim 1, wherein both the predetermined modal power distribution characteristic and the resulting modal power distribution characteristic are specklegrams, the predetermined modal power distribution characteristic is a record in a specklegram database having a plurality of records, each of the plurality of records is labeled with a corresponding predetermined position.

7. The method according to claim 1, wherein the resulting modal power distribution characteristic is received by a modal power distribution sensor.

8. The method according to claim 1, wherein the resulting modal power distribution characteristic is received by a camera.

9. The method according to claim 1, wherein the resulting modal power distribution characteristic passes through a Fourier lens.

10. The method according to claim 1, wherein the light is reflected and captured in a near field range.

11. A system for determining a displacement of an object, the system comprising:
    a multimode waveguide including a first end and a second end;
    a light source, configured to provide a light onto a surface of the object resulting in a reflected light, wherein the reflected light enters the first end of the multimode waveguide, propagates through the multimode waveguide and exits the second end of the multimode waveguide, and the exited reflected light having a modal power distribution; and
    a modal power distribution sensor, configured to capture the exited reflected light at the second end, and extract a characteristic of the modal power distribution.

12. The system according to claim 11, wherein the light source is a coherent light source.

13. The system according to claim 11, wherein the multimode waveguide is a multimode fiber.

14. The system according to claim 11, wherein the characteristic of the modal power distribution is a specklegram.

15. The system according to claim 14, wherein the modal power distribution sensor is a camera.

16. The system according to claim 13, wherein the multimode fiber is a bifurcated multimode fiber including a coupler and a third end, the light from the light source enters the third end and reaches the first end via the coupler.

17. The system according to claim 11, wherein a distance between the first end and the surface of the object is within a near field range.

18. The system according to claim 11, further comprising a database including a plurality of characteristics of the modal power distribution.

19. The system according to claim 18, further comprising a processor for comparing the characteristic of the modal power distribution with at least one of the plurality of characteristics of the modal power distribution in the database.

20. A non-transitory computer readable medium, comprising processor-executable instructions, which when executed cause a processor to implement operations of determining a displacement of an object, the operations including:
    providing a predetermined modal power distribution characteristic;
    directing a light onto the object resulting in a reflected light;
    propagating the reflected light through different propagation modes;
    receiving a resulting modal power distribution characteristic; and
    comparing the resulting modal power distribution characteristic with the predetermined modal power distribution characteristic to determine the displacement of the object.

* * * * *